United States Patent Office 2,817,587
Patented Dec. 24, 1957

2,817,587

METHOD OF STORING SILAGE FODDER

Kornelis Pleunis Kalis, Voorburg, Netherlands, assignor of one-half to N. V. Maatschappij tot Exploiteren van Octrooien en Licenties "Matepa," 's-Hertogenbosch, Netherlands, a corporation of the Netherlands No Drawing. Application February 15, 1954
Serial No. 410,439

1 Claim. (Cl. 99—8)

This invention relates to a method of storing silage fodder, in which the fodder is formed into a heap and is covered with at least two layers of overlapping strips of flexible and air-tight material.

According to this known method the roughage is completely surrounded by a flexible air-tight material and the heap thus formed is covered with earth in order to prevent atmospheric air from contacting the mass of green fodder.

If, however, a heap of grass is covered with flexible air-tight material and with earth in this manner it is found in actual practice that in the green fodder thus stored rotting cannot be prevented, so that, therefore, the ensilage is not successful.

Meanwhile this is not to be wondered at, because by simply covering the mass with e. g. strips of plastic, it is impossible to obtain a hermetic sealing which will prevent air from being sucked into the mass of fodder by a subatmospheric pressure prevailing in said mass, notwithstanding the fact that plastic in itself is sufficiently air-impermeable. By means of such a covering with plastic strips it is never possible to reach the same effect as with an air-tight silo into which atmospheric air cannot be sucked by the mass of green fodder, and consequently it is not possible to prevent rotting.

Superatmospheric pressures prevailing in a mass of green fodder does not constitute a difficulty in the ensilage, because in that case oxygen from the air will not enter the mass. Subatmospheric pressures, on the other hand, form the weak point and require special provisions which cannot be avoided because subatmospheric pressures will periodically prevail in the mass of green fodder for the following reasons. As soon as the mass of green fodder has been introduced into a silo it gets heated owing to breathing, whereupon it cools again. Variations in atmospheric pressure and in temperature will always cause subatmospheric pressures in a hermetically sealed mass of green fodder, which will tend to suck in air and this can only be avoided by means of expensive silo constructions.

However, it is not possible to prevent air from being sucked into a mass of green fodder which is covered with plastic strips.

The applicants have now found that nevertheless a good ensilage is possible if over the plastic strips covering the mass of green fodder a layer of organic material is spread and if said layer is in turn covered with plastic strips over which strips some earth or organic material is spread again.

In this manner air is certainly not prevented from being sucked into the mass of green fodder when a subatmospheric pressure prevails, therein, but, as may be concluded from the good results, the air sucked in at all events passes so slowly through the covering layer of organic material that all atmospheric oxygen is converted into carbon dioxide before the air sucked in reaches the fodder.

The invention will now be illustrated by means of the following examples.

Example 1

Grass is crushed by means of a crushing machine, a substance for assisting in the ensilage being added during or subsequent to the crushing operation if desired. The grass thus pretreated is arranged or built up in an elongated heap on a backing of synthetic resin material lying on the ground, and the grass is sufficiently trod down to prevent as far as possible a subsequent subsidence thereof. Overlapping strips of synthetic resin material are then arranged transversely across the heap and a layer of organic material, such as earth, turf sods, farm manure or saw dust is then spread over the covering, which material is capable of converting oxygen into carbon dioxide. Subsequently overlapping strips of synthetic resin material are arranged over said oxygen converting material in an analogous manner, and the outer covering is finally covered and secured in position with a layer of earth which may be of shallow depth.

The heap of silage thus covered is sufficiently insulated to prevent condensation on the internal surface of the inner covering of synthetic material with the concomitant danger of the outer layer of the heap rotting. Furthermore the layer of earth or other material having oxygen-conversion properties enclosed between the two coverings of overlapping strips of synthetic resin material, will convert into carbon dioxide the oxygen contained in the silage, and the oxygen from the surrounding air that may enter, so that no oxygen will have access to the stored fodder.

Example 2

Pre-dried grass is arranged in layers in an elongated heap, and the layers are firmly trod down. The elongated heap is then covered transversely with plastic strips. A layer of farm manure is spread over the covering and a second or outer covering of plastic strips is arranged over the manure, which second covering is secured in position with earth or farm manure and finally covered with a layer of earth to compress the mass of fodder as much as possible.

The double layer of plastic strips having a layer of organic material arranged between them offers the additional advantage that a heat insulating covering is obtained. A single layer of strips of plastic, even if it is covered with a layer of earth, will give rise to water vapour condensing against the inner side of the plastic strips when said strips cool off, more particularly in rainy weather when cold rain penetrated through the covering layer of earth and leaks down the plastic strips, or when there is a strong cold wind. This water of condensation will moisten the outer layer of the covered heap of silage fodder and will cause said layer to rot, especially in the case of dry ensilages.

The method of the present invention offers the advantage that it can be carried out without the use of a silo and that no loss of the outer layer of the mass of fodder results from rotting. Furthermore the method economizes in labour, more particularly when the heap of stored fodder is gradually used up.

I claim:

A method for storing silage fodder comprising forming the fodder into a heap, covering the heap with at least two coverings of overlapping strips of flexible and air-tight material, providing between said coverings a layer of oxygen converting material other than fodder, and covering the outer covering with earth.

References Cited in the file of this patent

UNITED STATES PATENTS 1,186,391   Gary ------------------ June 6, 1916

FOREIGN PATENTS 468,940   Great Britain ------------------- 1937